US006666614B2

United States Patent
Fechter et al.

(10) Patent No.: US 6,666,614 B2
(45) Date of Patent: Dec. 23, 2003

(54) AUTOMATIC LATCHING LOCKOUT SHAFT SENSING COUPLER

(75) Inventors: Mark A. Fechter, West Bend, WI (US); Scott J. Zangl, Hartford, WI (US)

(73) Assignee: Weasler Engineering, Inc., West Bend, WI (US)

(*) Notice: Subject to any disclaimer, the term of this patent is extended or adjusted under 35 U.S.C. 154(b) by 0 days.

(21) Appl. No.: 09/928,762

(22) Filed: Aug. 13, 2001

(65) Prior Publication Data

US 2003/0031508 A1 Feb. 13, 2003

(51) Int. Cl.[7] .................................................. F16B 7/02
(52) U.S. Cl. ................. 403/321; 403/322.1; 403/322.2; 403/327; 403/359.5; 403/DIG. 4; 403/DIG. 6
(58) Field of Search ........................ 403/321, 322.1, 403/322.2, 327, DIG. 6, 361, 359.5, 375, DIG. 4

(56) References Cited

U.S. PATENT DOCUMENTS

| 4,318,630 A | * | 3/1982 | Herchenbach et al. ... | 403/322.2 X |
| 4,900,181 A | | 2/1990 | Geisthoff | |
| 4,960,344 A | * | 10/1990 | Geisthoff et al. .... | 403/322.2 X |
| 5,632,568 A | | 5/1997 | Fechter | |

FOREIGN PATENT DOCUMENTS

| WO | WO 97/37607 A2 | 10/1997 |
| WO | WO 98/49957 A1 | 11/1998 |
| WO | WO 99/02096 A1 | 1/1999 |
| WO | WO 99/44519 A2 | 9/1999 |

OTHER PUBLICATIONS

PCT International Search Report, dated Nov. 16, 2000, for PCT Int'l. Pub. No. WO 00/67832.

* cited by examiner

Primary Examiner—Lynne H. Browne
Assistant Examiner—Victor MacArthur
(74) Attorney, Agent, or Firm—Quarles & Brady LLP

(57) ABSTRACT

A coupler assembly for axially coupling a hub onto a shaft includes a latch assembly that prevents a locking collar from latching to the hub in a released or disengaged position when the shaft is in the hub. The collar latch assembly includes a latch ring biased eccentrically about the hub and release members when in a released position so as to engage a surface of the hub. When the shaft is inserted into the hub, the release members move to a radially outward position and center the latch ring on the hub. This allows the collar to slide by spring force to a locked position in which the locking members are moved radially inward to engage recesses in the shaft. The release members remain in the radially outward position as long as the shaft is in the hub, thereby preventing the locking ring from engaging the hub and locking the collar in the released position while the shaft is engaged with the hub.

10 Claims, 2 Drawing Sheets

AUTOMATIC LATCHING LOCKOUT SHAFT SENSING COUPLER

CROSS-REFERENCE TO RELATED APPLICATIONS

Not applicable.

STATEMENT REGARDING FEDERALLY SPONSORED RESEARCH/DEVELOPMENT

Not applicable.

BACKGROUND OF THE INVENTION

This invention relates to a coupler for removably locking a hub to a shaft.

Couplers for removably locking a hub axially on a shaft are well known, see e.g., U.S. Pat. Nos. 4,900,181; 4,960,344; and 5,632,568. The hubs can have an end which is the yoke of a universal joint for attachment to a power drive assembly rotating the shaft. For example, such couplers are often used to couple the power input shaft of an agricultural implement to the power takeoff shaft of a tractor. Typically, the hub is internally splined to match the external splines on the tractor's power takeoff shaft, so as to establish rotary transmissive coupling between the hub and the power take-off shaft.

The hub is typically locked onto the shaft by locking members that can slide in radially extending slots through the hub so as to engage a circumferential groove or raceway in the splined power takeoff shaft of the tractor. A collar around the outside of the hub is biased into a locked position by a spring so as to prevent the locking members from backing away from the shaft.

The coupler disclosed in U.S. Pat. No. 4,900,181 has a stop formed in the collar that extends radially inwardly to abut a stop in the hub when the collar is tilted or cocked with respect to the axis of the shaft. When the shaft is inserted into the hub, locking members in the hub are moved radially outward to center the collar and disengage the stops. The collar can then be moved to lock the hub onto the shaft under the bias of a spring. However, the collar can be locked in a disengaged position even though the shaft is fully inserted into the hub. Thus, the hub may appear properly locked onto the shaft despite the collar being disengaged.

U.S. Pat. No. 5,632,568 provides a coupler in which the locking collar cannot be disengaged with the shaft fully inserted into the hub. In particular, the hub has a stop that a locking collar engages when cocked in a disengaged position. Inserting the shaft into the hub drives uncocking members radially outward to position the locking collar concentric with the hub so as to disengage it from the stop. The locking collar can then be slid to cam the locking members inwardly to lock the hub onto the shaft under the bias of the spring. The uncocking members prevent the collar from being cocked so that the collar cannot engage the stop and be locked in the disengaged position.

While this provides a significant improvement, like the former coupler, this coupler has a tilted or cocked collar. The collar thus gives the appearance of being loose or damaged. More importantly, this can be disadvantageous because if the collar is bumped inadvertently, it can spring into the locked position before the shaft is inserted into the hub. Also, with the collar in the locked position, the shaft cannot be inserted into the hub, thereby frustrating the user. Thus, the user must recognize this and manually reset the collar before coupling the shaft to the hub.

U.S. Pat. No. 4,960,344 discloses a coupler in which an eccentrically biased control ring and a concentric locking ring inside the collar operates locking members so that the collar remains concentric with the hub throughout its range of movement. When the shaft is inserted into the hub the locking members drive the control ring outward concentric with the axis to disengage from a stop surface and allow the collar to slide and lock the hub onto the shaft. In this position, the locking ring retains the locking members in engagement with the shaft. However, like the first described coupler, the locking collar can be moved and locked in the disengaged position even though the shaft is seated in the hub.

Accordingly, there is a need in the art for an improved coupler assembly.

SUMMARY OF THE INVENTION

The present invention provides a coupler assembly for axially locking a hub to a shaft. The hub has an axial bore and radial slots spaced apart axially. A collar fits concentrically about the hub and can be slid thereon from a released position to a locked position. A collar latch assembly includes a latch ring and a release member radially movable in a radial slot. When the collar is in the released position, the latch ring is eccentric about the hub and the release member and engages a radial surface of the hub on one side of the latch ring and a radial surface of the collar on the other side of the latch ring to prevent movement of the collar. When the collar is in the locked position and the shaft is inserted in the bore of the hub, the latch ring is centered about the hub in a channel of the collar to allow the collar to slide along the hub so that a locking member can move in a radial slot to engage a recess in the shaft. The release member is in a radially outward location so as to prevent engagement of the latch ring with the hub while the shaft is in the hub.

In a preferred form, the hub has a first set of two radial slots angularly spaced about 180 degrees from each other and containing ball-shaped locking members. The hub also has a second set of four radial slots containing ball-shaped release members and angularly spaced about 90 degrees from each other and axially spaced from the two locking member slots.

In another form, the collar latch assembly further includes a spring, preferably a leaf spring, biasing the latch ring eccentrically with respect to the hub. The collar latch assembly further includes a compression spring disposed about the hub and biasing the collar toward the locked position. The compression spring is captured between the collar and a stop ring which may be integral with or otherwise fixed with respect to the hub.

One object of the invention is to provide a coupler that cannot be locked in a released position when the shaft is engaged in the hub. This is accomplished by a set of release members that prevent the latch ring from engaging the hub, and thereby latching the collar, when the shaft is in the hub. This latching lockout occurs automatically when the shaft is inserted in the hub.

Another object of the invention is to provide a coupler with a locking collar that is maintained concentrically with the hub throughout its range of movement. This is accomplished by providing a latching mechanism for retaining the collar to the hub.

Another object of the invention is to provide a coupler that automatically locks the shaft to the hub upon insertion of the shaft into the bore of the hub. Inserting the shaft into the hub moves the release members radially outward to disengage the latch ring, thereby allowing the collar to slide to the locked position, under the force of the compression spring, in which the locking members are held in engagement with the recess of the shaft.

The foregoing and other objects and advantages of the present invention will appear from the following description. In the description, reference is made to the accompanying drawings which form a part hereof and in which there is shown by way of illustration a preferred embodiment of the invention. Such an embodiment does not necessarily represent the full scope of the invention, however, and reference must be made therefore to the claims for interpreting the scope of the invention.

BRIEF DESCRIPTION OF THE DRAWINGS

FIG. 4 is an end cross-sectional view showing a latch ring biased eccentrically within the collar about the hub when in the released position of FIG. 2.

DETAILED DESCRIPTION OF THE PREFERRED EMBODIMENT

Figure 1:
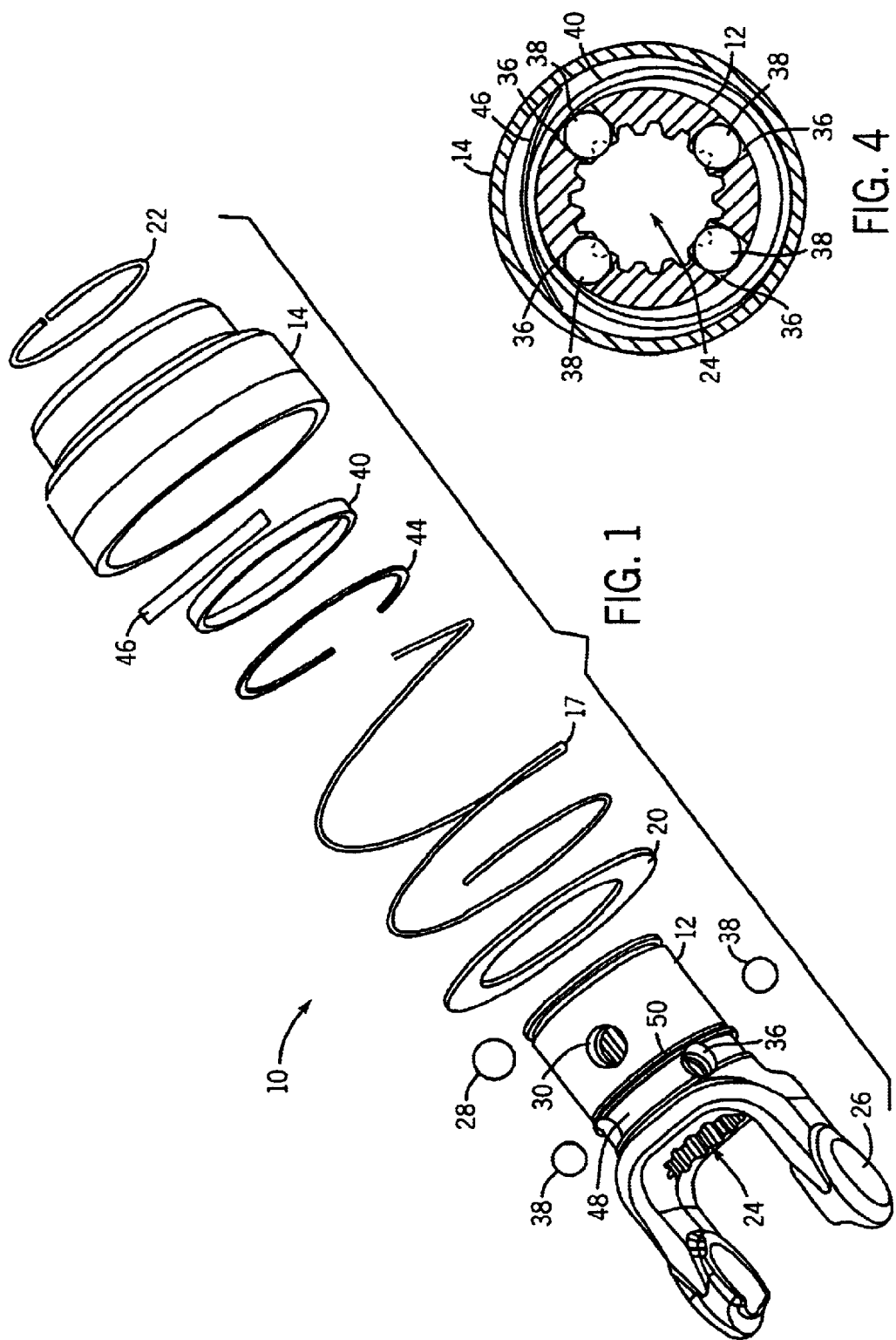
FIG. 1 is an exploded perspective view of a coupler assembly of the present invention.
Figure 2:
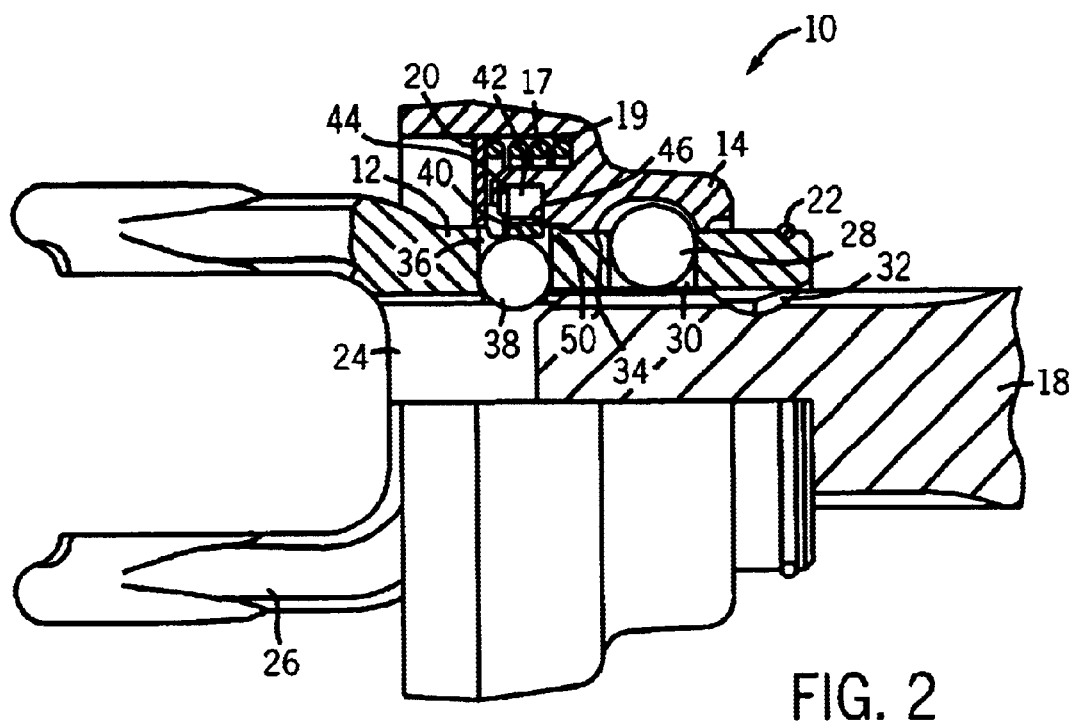
FIG. 2. is a partial cross-sectional view of the coupler with the shaft partially inserted into the shaft and the collar in the released position with the elements 28 rotated into the same plane as the elements 38 for illustrative purposes.
Figure 3:
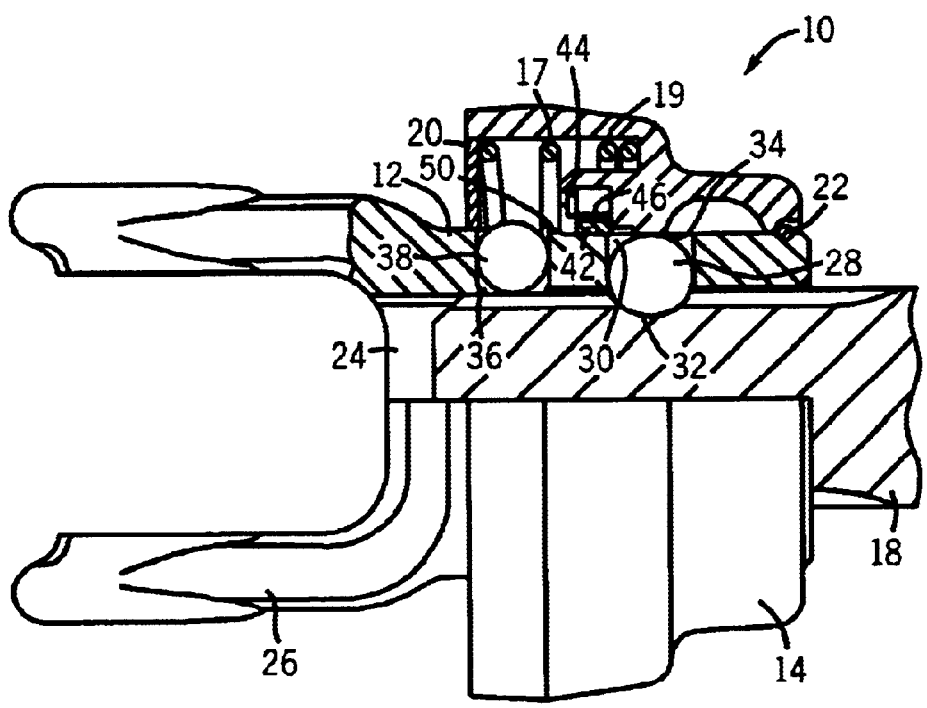
FIG. 3 is a view similar to FIG. 2 but with the shaft fully inserted into the hub and the collar in the locked position.

Referring to FIGS. 1–3, a coupling assembly 10 includes as main components a hub 12, a collar 14 and a latch assembly. Generally, the latch assembly locks or latches the collar 14 in a released position shown in FIG. 2 until an axially extending splined shaft 18 is inserted in the hub 12, in which case the collar is automatically slid along the hub 12 to a locked position shown in FIG. 3. The collar 14 is biased toward the locked position by a compression spring 17 of the latch assembly disposed about the hub 12 and acting between a washer or stop ring 20 and an inner annular pocket 19 in the collar 14. The stop ring 20 is preferably affixed to the hub 12 by bias of the spring 17 although it could be an integral part of the hub 12 or welded thereto. A snap ring 22 fits in a cirumferential groove at the front of the hub 12 to prevent the collar 14 from being pushed off the hub 12 by the spring 17.

The bore 24 of the hub 12 is internally splined to mate with external splines of the shaft 18. The rear end of the hub 12 forms a yoke 26 for attaching the hub 12 to a device to be driven by the shaft 18. For example, the shaft could be part of a tractor's power takeoff and used to drive an agricultural implement.

The hub 12 and the shaft 18 are locked together by two locking members 28 disposed in corresponding radial slots 30 in the hub 12 angularly spaced apart by 180 degrees. The slots 30 open at the outer and inner diameters of the hub 12 and taper inwardly to have a reduced diameter at the inner diameter. This allows the locking members 28 to protrude into the bore 24 of the hub 12 without passing completely through the slots 30. There is sufficient clearance between the slots 30 and the locking members 28 to allow them to move radially in the slots 30. The locking members 28 preferably are balls that can roll and slide within the slots 30 so that when the shaft 18 is inserted in the bore of the hub 24 the locking members 28 engage a circumferential groove or recess 32 about the periphery of the shaft 18 spaced in from the end. When the collar 14 is moved to the locked position, an annular cam surface 34 at the inner diameter of the collar 14 will contact and move the locking members 28 inwardly into the recess 32. The collar 14 maintains the locking members 28 in this inward position so that the shaft 18 can not be moved axially inward or outward and disengage from the hub 12.

Referring now to FIGS. 2 and 4, the hub 12 also includes a set of four radial slots 36 spaced apart approximately 90 degrees around the circumference of the hub 12 and axially behind the locking member slots 30. The slots 30 open at the outer and inner diameters of the hub 12 and taper inwardly to have a reduced diameter at the inner diameter so that ball-shaped release members 38 contained therein can protrude, but cannot pass, into the bore 24 of the hub 12. There is sufficient clearance between the slots 36 and the release members 38 when the collar 14 is in the released position such that the release members 38 can roll and slide radially therein.

A latch ring 40 is disposed about the release members 38 and contained in an annular channel 42 inside the collar 14 by a retaining ring 44 having a smaller inner diameter than the outer diameter of the latch ring 40. A leaf spring 46 in the channel 42 biases the latch ring 40 eccentrically with respect to the hub 12. Referring to FIGS. 1, 2 and 4, in the released position opposite arcs of the latch ring 40 rest against the recessed outer diameter 48 of the hub 12 and the inner diameter of the collar 14 under the force of the leaf spring 46. In this position, the latch ring 40 engages an annular ledge 50 extending radially outward around the outer diameter of the hub 12 on one side of the latch ring 40 and the inner radially extending side face of the retaining ring 44 on the other side of the latch ring 40. The collar 14 is thus prevented from being slid along the hub 12 by the spring 17 due to the contact of the latch ring 40 with the hub ledge 50 and the inner surfaces, particularly the side face of the ring 44, of the collar 14 defining the channel 42.

The ledge 50 is sized so that the diameter of the release members 38 are at least equal to the distance from the inner diameter of the bore 24 to the radial outer edge of the ledge 50. Thus, when the shaft 18 is inserted into the bore 24, the raised spline surface of the shaft 18 cams the release members 38 radially outwardly, and the release members 38 thereby push the latch ring 40 radially outward beyond the ledge 50 and concentric with the hub 12. This releases the latch ring 40 from the ledge 50 of the hub 12 and allows the spring 17 to move the collar toward the locked position (right in FIGS. 2 and 3). As mentioned above, the annular cam surface 34 at the inner diameter of the collar 14 will contact and move the locking members 28 inwardly into the peripheral shaft recess 32. The collar 14 maintains the locking members 28 in this inward position so that the shaft 18 cannot be moved axially inward or outward to disengage from the hub 12.

Thus, the collar 14 is initially latched in the released position (i.e., before the shaft 18 is inserted in the hub 12). Upon insertion of the shaft 18 into the bore 24, the locking members 28 are cammed radially outward in slots 30, as shown in FIG. 2. As the shaft 18 is inserted further, the release members 38 are cammed radially outward by the shaft 18 against the leaf spring 46 to disengage the latch ring 40 from the ledge 50 of the hub 12, thereby allowing the spring 17 to move the collar 14 from the released position to the locked position shown in FIG. 3. In doing so, the cam surface 34 of the collar 14 cams the locking members 28 radially inwardly into the groove or recess 32 of the shaft 18 to axially lock the hub 12 onto the shaft 18. As long as the shaft 18 is fully in the bore 24, the release members 38 remain in the radially outward position to lockout the latch ring 40 so it cannot re-engage the ledge 50 in the event the collar 14 was moved back against the spring 17. Thus, the collar 14 is prevented from latching in the released position when the shaft 18 is engaged with the hub 12.

The shaft 18 can be disengaged from the hub 12 only by manually pulling the collar 14 backward (to the left in FIG. 3) against the spring 17. As mentioned, the collar 14 will not latch in this position until the shaft 18 is pulled out of the bore 14. Once the shaft 18 is removed, the latch ring 40 can re-engage with the ledge 50 and the collar 14 can be latched in the released position, concentric with the hub 12.

The present invention thus provides a coupler assembly that cannot be locked in a released position when the shaft is engaged in the hub. The coupler also provides a locking collar that is maintained concentrically with the hub. Moreover, the coupler automatically locks the shaft to the hub upon insertion of the shaft into the bore of the hub.

A preferred embodiment of the invention has been described in detail for the purpose of disclosing a practical, operative structure whereby the invention may be practiced advantageously. The design described is intended to be illustrative only. For example, the number and shape of the locking and release members could be varied. However, three or more release members is preferred to properly center the locking ring. The novel characteristics of the invention may be incorporated in other structural forms without departing from the scope of the invention.

We claim:

1. A coupler assembly for locking a shaft to a hub, comprising:
   a hub having a bore with a bore axis and a first slot axially spaced from a second slot, the first and second slots extending perpendicular to the bore axis;
   a collar concentrically disposed about the hub and defining a channel at its inner diameter, the collar being slidable along the hub from a released position to a locked position;
   a locking member movable in the first slot to engage a recess in the shaft when the shaft is inserted into the hub bore and the collar is in the locked position; and
   a collar latch assembly including a release member movable in the second slot perpendicular to the bore axis and a latch ring eccentrically disposed about the hub and the release member when the collar is in the released position so that one side of the latch ring engages a ledge of the hub which extends perpendicular to the bore axis and an opposite side of the latch ring engages a surface of the collar which extends perpendicular to the bore axis so that the collar is fixed in the released position, the collar being fixed in the released position until the shaft is inserted into the hub bore sufficiently to move the release member and the latch ring outward perpendicular to the bore axis to release the latch ring from engagement with the ledge and permit the collar to move to the locked position when the shaft is in a fully inserted position in which the locking members are seated in the recess of the shaft, the release member preventing the latch ring from engaging with the ledge in the fully inserted position of the shaft.

2. The coupler assembly of claim 1, further including additional locking members and additional release members, wherein the hub includes a set of first slots spaced angularly from each other and along the bore axis from a set of second slots spaced angularly from each other and wherein each of the first slots contains one of the locking members and each of the second slots contains one of the release members.

3. The coupler assembly of claim 2, wherein there are four of the second slots spaced apart 90 degrees and wherein there are four of the release members.

4. The coupler assembly of claim 2, wherein the locking and release members are balls.

5. The coupler assembly of claim 2, wherein the collar latch assembly further includes a spring biasing the latch ring eccentrically with respect to the hub.

6. The coupler assembly of claim 5, wherein the spring is a leaf spring.

7. The coupler assembly of claim 5, wherein the collar positioning assembly further includes a compression spring disposed about the hub and biasing the collar to the locked position.

8. The coupler assembly of claim 7, further comprising a stop ring fixed with respect to the hub for capturing the compression spring within the collar.

9. The coupler assembly of claim 1, wherein the collar includes a cam surface for maintaining the locking member in a radially inward position when the collar is in the locked position.

10. The coupler assembly of claim 1, wherein the bore of the hub is splined.

* * * * *